United States Patent [19]
Sakabe et al.

[11] 3,732,051
[45] May 8, 1973

[54] MOLDING APPARATUS FOR PRODUCING RESINOUS THERMOPLASTIC ARTICLES

[75] Inventors: Masaya Sakabe; Elichi Kobinata; Masaru Takaoka, all of Inashiki-gun, Japan

[73] Assignee: Mitsubishi Petrochemical Company, Limited, Tokyo-to, Japan

[22] Filed: Aug. 27, 1970

[21] Appl. No.: 67,510

[52] U.S. Cl. .................425/407, 425/357, 425/408, 425/436, 425/447, 425/451, 425/468
[51] Int. Cl. .............................................B29c 24/00
[58] Field of Search .........................................18/4 P

[56] References Cited

UNITED STATES PATENTS

| 3,506,755 | 4/1970 | Rudder et al. | 18/4 P X |
| 2,112,513 | 3/1938 | Abbott et al. | 18/4 P |
| 2,582,449 | 1/1952 | Millar et al. | 18/4 P |
| 3,242,527 | 3/1966 | Rosenberg | 18/4 P |

Primary Examiner—H. A. Kilby, Jr.
Attorney—McGlew & Toren

[57] ABSTRACT

Apparatus for producing large-sized synthetic resin foamed articles, such as pallets for carrying, transporting and storing freight goods, which are relatively bulky and heavy in weight and which can not be produced with an oridnarily available injection machine having limited capacity, is provided, which comprises metallic including an upper and lower section, means for transporting said molds in an endless path including means for changing the direction of travel of said molds, means for removing the upper section from the lower section and for transporting said upper section to a point downstream where it may be replaced upon a lower section filled with plastic material, means for remaining a formed article from the lower section, means for filling the lower section with raw plastic material after which the upper section is replaced thereon, means for heating the mold in at least three consecutive stages having different temperature levels, and means for cooling the molds from which they are returned to the upper section removal means. The aforementioned means are consecutively arranged along the endless mold transporting path in the order hereinbefore set forth.

6 Claims, 27 Drawing Figures

FIG. I

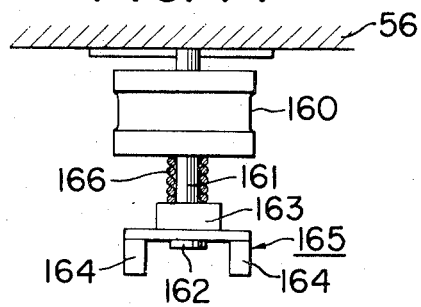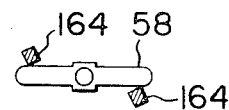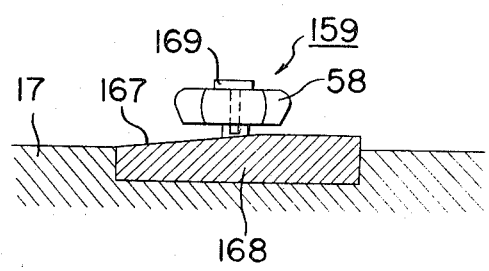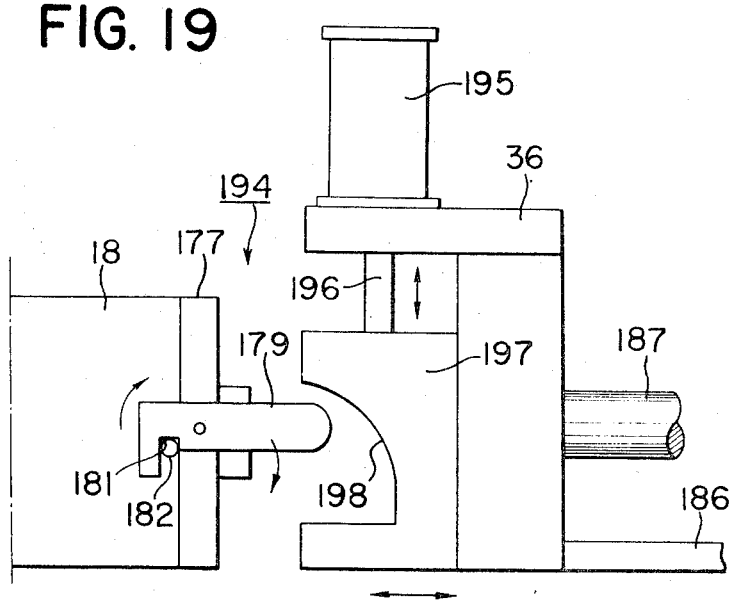

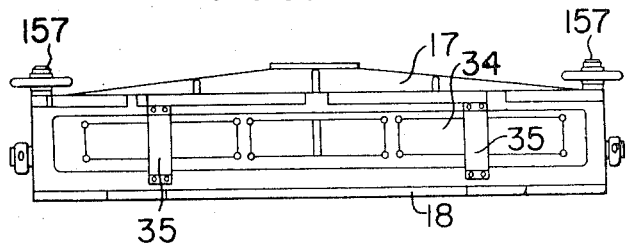
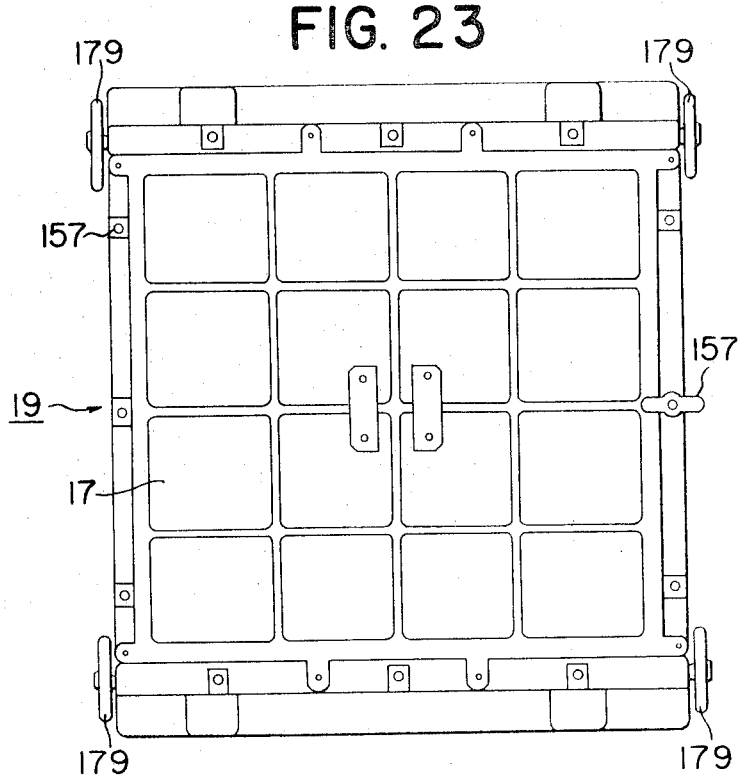
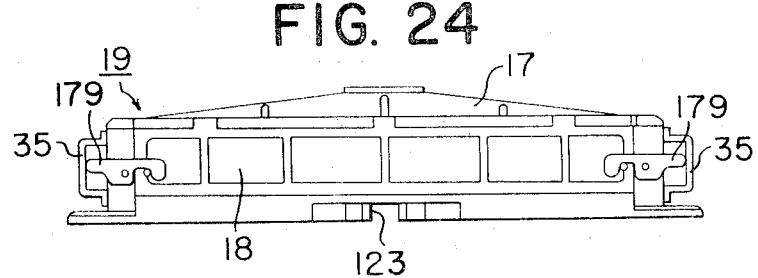

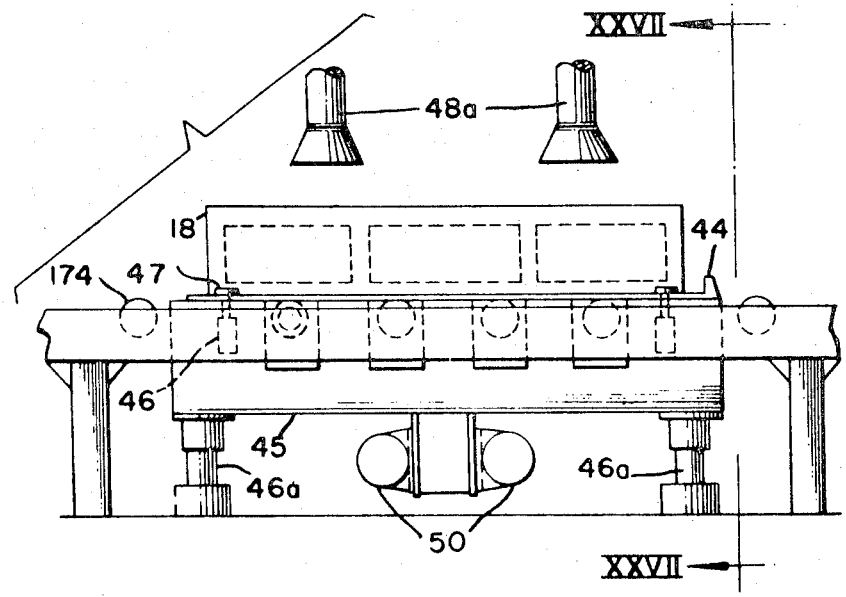
FIG. 26
FIG. 27
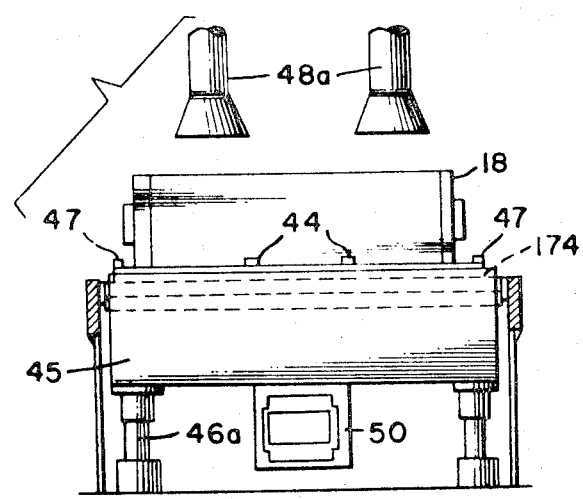

MOLDING APPARATUS FOR PRODUCING RESINOUS THERMOPLASTIC ARTICLES

BACKGROUND OF THE INVENTION:

In general, there are several means for producing formed articles with thermoplastic synthetic resin as the raw material, using injection molding machines.

However, since it is of course impossible to produce, with the injection molding machines, products which are more than their maximum plasticizing capacities, it has not been feasible to obtain large-sized products such as freight good stands or pallets by using a large amount of synthetic resin material, and also it is extremely uneconomical to design a special injection molding machine for producing a large-sized formed articles which requires a large quantity of material.

In particular, the metal molds in an injection molding machine are required to exhibit strength capable of resisting sufficiently the high pressure. Accordingly, the metal molds capable of molding large-sized formed articles, cannot help becoming very large and also heavy in weight, and accordingly become extremely expensive. Further, in such case, the mold clamping mechanism is also required to be a large sized and powerful one.

Furthermore, in case of molding formed articles having relatively large thickness with foaming synthetic resin, the cooling of formed articles takes a long time because of low heat conductivity of said foaming systhetic resin. For this reason, in an injection molding process, it is impossible to take out the formed articles from the metal molds by opening the same for the period of time from the commencement of the molding by filling the melted resin material into the molds under pressure until cooling and curing of the formed articles. Consequently, it takes a long time to begin the subsequent molding and the production efficiency is extremely low.

The object of the present invention is to provide a means for producing in a production line system, large-sized synthetic resin foamed articles such as pallets, used for convenience of transportation or for storing, which are relatively bulky and heavy in weight, and which can not be produced with an ordinarily available injection molding machines having limited capacities.

A main object of the present invention is to produce thermoplastic synthetic resin foamed articles having relatively large-size in a production line system.

Another object of the present invention is to provide apparatus appropriate for producing continuously large-sized synthetic resin foamed articles, such as freight goods stands, or pallets, which use a large quantity of foaming thermoplastic synthetic resin as the material.

A further object of the present invention is to provide method and apparatus which are appropriate for producing large-sized synthetic resin foamed articles, which comprises establishing stages of temperature regions in the main body, and transferring successively forming molds which have been filled with desired foaming thermoplastic synthetic resin into the temperature region stages, whereby the synthetic resin foamed articles are produced in said forming molds.

Another object of the present invention is to make it possible to carry out a continuous production line system, utilizing temperatures necessary for the forming process of filled foaming synthetic resin while transferring the forming molds, whereby the production efficiency is increased markedly.

Still another object of the present invention is to provide apparatus for an automatic line system for producing relatively large-sized thermoplastic synthetic resin foamed articles, which comprises filling foaming resin material in metal molds, closing the metal molds, introducing the metal molds filled with the foaming resin material into a heating device, passing said metal molds through said heating device while producing temperatures necessary for the forming processes of the resin material, cooling the formed articles together with the metal molds, opening the molds, taking out the formed articles from the metal molds, cleaning the metal molds and carrying the metal molds to a station where the resin material is again introduced and continuously repeating the aforementioned process.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING:

FIG. 14 is an enlarged side elevation showing a rotary clamping means of in FIG. 13;

FIG. 15 is a plan view of the rotary clamping means;

FIG. 16 is an enlarged side elevation of a part which clamps the metal mold;

FIG. 19 is a side view showing an essential part for placing and taking-out of the core;

FIG. 22 is a front view of the mold to be used in production of the pallet;

FIG. 23 is a plan view of the mold shown in FIG. 22;

FIG. 24 is a side view of the mold shown in FIG. 22;

FIG. 26 is a side elevation of a device for filling the lower mold with plastic material; and FIG. 27 is an end elevation taken at the line XXVI - XXVI of FIG. 26.

DETAILED DESCRIPTION OF THE INVENTION

Figure 1:
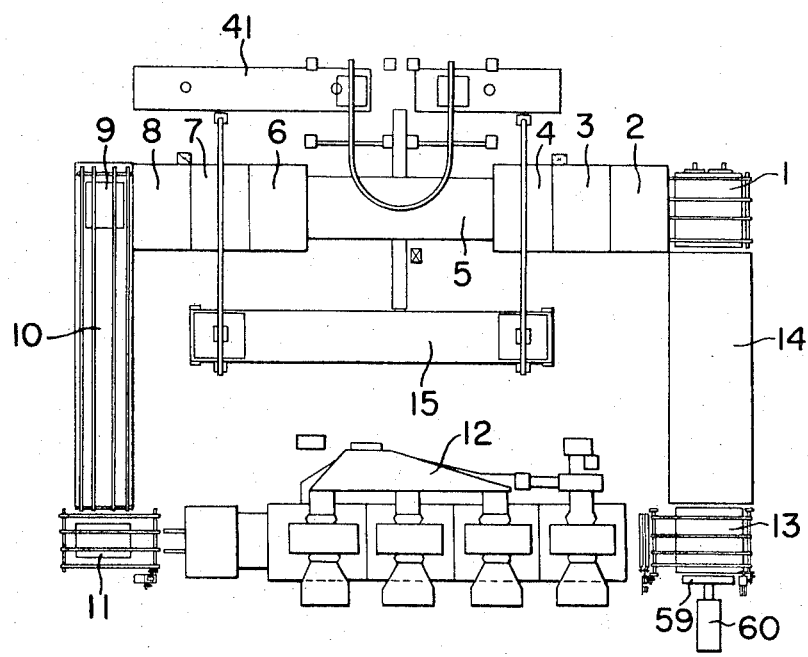
FIG. 1 is a plan view showing an example of the automatic line system according to the present invention.
Figure 20:
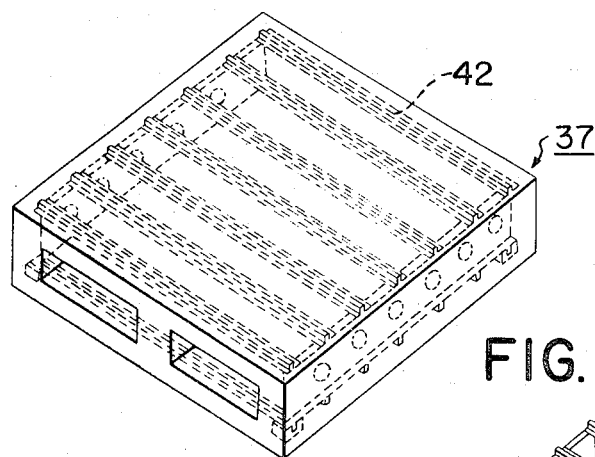
FIG. 20 is a perspective view showing a pallet formed by applying the method according to the present invention.
Figure 21:
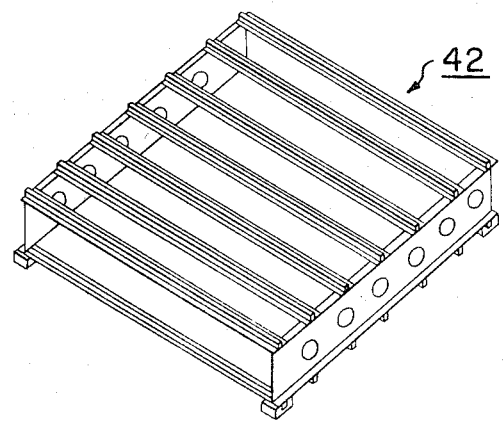
FIG. 21 is a perspective view of a reinforcing frame used in the formation of said pallet.
Figure 25:
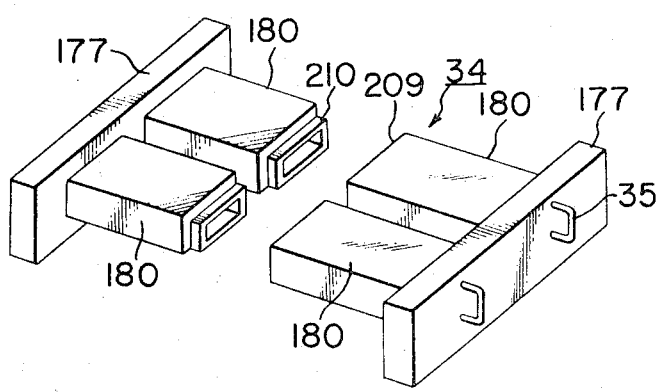
FIG. 25 is a perspective view of a core to be used in the mold for the production of the pallet.

An example of the automatic line system according to the present invention will now be described referring to FIG. 1 through 3. In this example, a case is shown wherein a pallet is produced using a foaming thermoplastic synthetic resin material, said pallet being useful for carrying freight goods or for keeping or storing freights. The pallet is provided with inserting holes for the forks of a fork lift truck (not shown) as shown in FIG. 20, and the pallet is of a type which is embedded integrally with a reinforcing frame made of steel for reinforcement as shown in FIG. 21. The forming metal mold consists of an upper mold and an lower mold, and a core.

Each of the stations will be explained referring to FIG. 1.

The numeral 1 designates a station for changing the advancing direction of a metal mold containing a formed article, 2 is a mold drying station, 3 is a releasing station for the upper mold which releases a clamping mechanism of the upper mold clamped on the lower mold, 4 is an upper mold removing station, 5 is a preparing station wherein the core is taken out, the formed article is taken out, the inner surface of the lower mold is cleaned, the core is arranged at a predetermined position in the lower mold, preparation of the formed article is released for setting a reinforcing frame, and the lower mold is prepared before filling with resin, 6 is a filling station for filling resin material into the lower mold, 7 is an upper mold setting station for setting the upper mold on the lower mold which has been filled with foaming resin material, 8 is an upper mold clamping station for clamping the upper mold on the lower mold, 9 is a station for changing the advancing direction of the resin filled metal mold, 10 is a metal mold carrying station, 11 is a direction changing station before the metal mold is introduced to the heating device, 12 is a heating device of the metal mold filled with resin material, 13 is a direction changing station of metal mold for leading it to a cooling region after the resin material in the metal mold has completed its forming, 14 is a cooling station for cooling the metal mold containing the formed article and to accelerate the solidification of the formed article, and 15 is a carrying route of the upper mold from said upper mold releasing station to said upper mold setting station.

Thus, in this example, the entire layout is distributed into a required number of stations along a rectangular route so that the entire space of the arrangement is reduced to a minimum, and yet there is provided a convenient automatic line system.

Such a circulating system reduces the floor space required for all of the device to a minimum, facilitates the maintenance and inspection of all the devices, and minimizes the operating personnel.

For convenience of explanation, the description will be made from a point where a metal mold, which contains the thermoplastic synthetic resin formed article comes out of the cooling station 14, and turns its advancing direction for 90° at the direction changing station 1 of the metal mold. However, the detail of the construction of the direction changing station 1 of the metal mold will be described later.

The metal mold stopped at the correct position in the direction changing station 1 is passed to the drying station 2, where the metal mold is dried by blowing hot air thereon supplied through an air valve provided at the stop position of the metal mold in said drying station 2 and through a conduit pipe 16 for a predetermined time by a timer controlled by an instruction mechanism (not shown).

The metal mold 19 is made of a combination of an upper mold 17 having a cover shape and a lower mold 18 having a box shape as shown in FIGS. 22 through 24. The metal mold which has been emptied of water drops at the drying station 2 is then carried to the following upper mold releasing station 3. The carrying mechanism of the metal mold from the station 2 to the station 3 is a roller conveyer, which operates perpendicular to the advancing direction, and is rotated, time-controlled, by any suitable driving mechanism. Unless particular explanation is given, the transfer mechanism of metal molds in this example is effected by the roller conveyer. The metal mold coming from the station 2 is stopped at a predetermined position by a stopper 20, and at the station 3, the metal mold 19 is released of its locking mechanism for the upper mold 17 which is clamped to the lower mold 18. A mechanism for releasing or clamping the upper mold is shown in FIGS. 12 – 16, and the detail of the clamping and releasing mechanism 21 will be described later.

The clamping of the upper mold 17 is released at the station 3, and the upper mold 17 and the lower mold 18 are passed to the station 4 in this state. The metal mold 19 is stopped at a predetermined position in the station 4 by the stopper 22. Here, in order to detach the upper mold 17 from the lower mold 18, a hoist 25 which is suspended from a trolley 24 arranged on a frame 23 is brought above the upper mold 17 at a controlled time, lowering the hoist 25 and causing a slide piece 26 to contact with the upper mold 17, and the slide piece 26 is locked to the upper mold 17. The upper mold 17 is suspended high by raising the hoist 25, and the upper mold 17 is placed on the conveyer on the upper mold carrying route 15 by transferring the hoist 25. The hoist 25 rises and returns to its waiting position after the upper mold 17 is placed on the conveyer 27.

The lower mold 18 thus removed of the upper mold 17 is passed to the following station 5. The lower mold 18 is engaged by stopper 28, and is stopped at a correct position. At the station 5, the lower mold 18 is fixed by four clamps 29 for fixing the metal mold 19 operated by the air cylinder. A laterally releasing cylinder 30 is advanced and stopped at a predetermined position.

A hydraulic cylinder 31 is operated, transferring the core fixing cylinder 32, and inserting a core hook clamp 33 into a hook 35 as shown in FIGS. 22 through 25 of the core 34. The core fixing cylinder 32 is operated and the core 34 is fixed by a support member 36 at the tip of the lateral releasing cylinder 30. The lateral releasing cylinder 30 is retreated and removes the core 34 from the formed article. In this case, since the core 34 is fixed by an oil pressure, it will not be suspended. On the way the core 34 is removed, water in the core 34 is removed by air. At this point, a vacuum pad 38 is placed just above the formed article 37, and the vacuum pad 38 is lowered by air cylinder 39 with the completion of the retreat of the lateral releasing cylinder 30, and the vacuum pad 38 is contacted against the formed article 37.

The formed article 37 is hoisted with the raising of the vacuum pad 38, and is carried to a depository 41 of formed articles 37 by trolley 40. At the same time when the trolley 40 having the vacuum pad 38 commences the transportation, another trolley 43 suspending a reinforcing frame 42 shown in FIG. 21 begins to move toward the center. In this case the reinforcing frame 42 is suspended by a permanent magnet. At the same time, air for removing water and a spray of releasing agent are applied on the inner surface of the metal mold controlled by a timer. When the spraying is over, the reinforcing frame 42 which has been placed just above is lowered. When the lowering is finished, the reinforcing frame is released from the magnet and then the trolley 43 is raised and returned to its original position. The lateral releasing cylinder 30 is advanced and the core 34 is placed in the lower mold 18. The combination of the core 34 and the lower mold 18 is effected by attaching the core hook clamp 33 mounted on the tip end of the core clamping cylinder 32. Subsequently, the core clamping cylinder 32 releases its fixing, and the clamp 33 is released by the hydraulic cylinder 31. The lateral releasing cylinder 30 resumes its original position. The details of a mold releasing device for the formed articles will be described later.

Next, the lower mold 18 inserted with the core 34 and the reinforcing frame 42 is brought to the filling station 6. In this case, too, the positioning of the lower mold 18 is effected by a stopper 44. A description of the mold filling apparatus shown in FIGS. 26 and 27 is as follows. A vibrating base 45 is raised by a cylinder 46a and the lower mold 13 is raised from the upper level of the roller conveyor 174. The lower mold 18 is clamped onto the vibrating base 45 by the fixing clamp 47 operated by the air cylinder 46. A timer of a measuring device 48 operates to discharge a predetermined quantity of foaming resin material 49 into the lower mold 18, and when the rated quantity of the material 49 is charged from four chutes 48a in the end of measuring device 48, filling of the resin material into the lower mold 18 is stopped. Then, a longitudinal vibration is produced by two vibrators 50, 50 mounted in parallel on the vibrating base 45, giving the vibration to the lower mold 18 for a predetermined time. In such a manner, when a core 34 is inserted in the lower mold 18, and the formation is effected by inserting a reinforcing frame 42 as in this example, the resin material 49 can be filled into all parts of the lower mold 18. The resin material 49, in this case, presents a pellet form. Through the vibration of the lower mold 18, the filling of the resin material 49 into the lower mold 18 is accelerated. When a desired state is achieved, the vibrator 50 is stopped, the clamping of the lower mold 18 against the vibrating base 45 is released, the stopper 44 is lowered and the vibrating base 45 is lowered by the air cylinder 46a.

Then the lower mold 18 filled with the resin material is passed to the upper mold setting station 7 by the roller conveyor 174. In this case, too, the lower mold 18 is located by a stopper 51. For the sake of security, the vibrating base 52 is raised in this station 7 as in the previous station 6, the lower mold 18 is clamped on the vibrating base 52 by fixing clamps 53, and the lower mold 18 is again vibrated for a predetermined time by means of a timer, so that the resin material may again be filled throughout the lower mold 18. When the vibration is over, fixing clamps 53 are unlocked, the vibrating base 52 is lowered, and the lower mold 18 is left on the conveyer 28. In this case, the upper mold 17 which has been released from the lower mold 18 in said station 4, is waiting above the station 7 passing through the upper mold carrying route 15. After the vibrating base 52 is lowered, the upper mold 17 is lowered and is put on the lower mold 18, and the upper mold 17 is clamped on the lower mold 18 and the metal mold 19 is set. When the setting of the upper mold 17 is finished, the slider piece 26 which has been suspending the upper mold 17 is released from the upper mold 17, and the slide piece 26 returns through the carrying route 15 and is placed in a waiting position beside the station 4.

Next, the metal mold 19, with the upper mold 17 set on the lower mold 18, is transferred to the station 8, and is located by a stopper 54. An adapter plate 56 provided with a rotary clamping means 55 is lowered by a hydraulic cylinder 57 through a limit switch provided on the stopper 54. The lowering is stopped at a position where the rotary clamping means 55 is engaged with a clamping lever 58 of the lower mold 18, and the rotary clamping means 55 is rotated. When the clamping is finished at the predetermined time by the timer, the rotary clamping means 55 is rotated reversely and is raised. The mechanism for clamping the upper mold 17 against the lower mold 18 will be described later.

After the upper mold 17 is clamped on the lower mold 18, and the metal mold 19 for forming is closed, the metal mold 19 is transferred to the station 9, and changing its direction for an angle of 90°, passing through the carrying station 10, and changes its direction again for 90° at the metal mold transfer station 11 in front of the heating device 12. Such a metal mold 19 is introduced to the heating device 12. As described in detail later, the heating device 12 in this example is provided with three stages of temperature regions, namely, a preheating section, a heating section, and a foaming section. The metal mold 19 is first preheated in the preheating section, and the resin material is melted in the heating section, and at the foaming section the resin material is foamed and the material is formed. In this way, the metal mold 19 coming out of the heating device 12 changed its direction for 90° at the station 13, and a pusher (59) is advanced by hydraulic cylinder (60), thereby the metal mold (19) is passed to the cooling station 14. A shower of water is poured over the metal mold 19 while it is transferred. Thus the metal mold 19 is cooled to a desired temperature for 15 minutes in its transfer, and the setting of the formed article in the metal mold 19 is accelerated.

Then, the metal mold 19 is transferred to the station 1, and in this station 1, the posture of the metal mold 19 is controlled so that the opening operation of the metal mold 19 which is to be carried out successively will be effected properly. The control mechanism for the posture of the metal mold 19 at the station 1 will be explained later.

The automatic line system in this example is applied on a plant of producing pallets using foaming resin material.

As described above, the metal mold 19 is transferred from the station 1 to the drying station 2, and to the clamp releasing station 3 of the metal mold 19, then passing through the rest of said stations successively, and the formed article 37 is taken out of the metal mold 19, and again, afer the metal mold 19 is prepared for a condition ready for forming, the metal mold 19 is introduced to the forming course through the station 6. With such a circulating route, pallets 37 are produced continuously and in a line system. Accordingly, by dividing the time required for each of the stations 1, 2, 3, . . . 15 according to the desired article to be formed, no waste time is to be found, and the plant will work with a high efficiency and the productivity will be much improved.

HEATING DEVICE

The heating device 12 used in this invention has the following construction.

The heating device 12 consists of a desired number of temperature stages arranged longitudinally in the main body, and the forming metal mold is transferred in this main body so that the thermoplastic resin formed articles are produced. Particularly, hot air is used as the heat source fo establishing said temperature regions, and after blowing the hot air having a predetermined temperature into the main body, and before said hot air flows widely in the longitudinal direction of the main body, sucking said hot air and establishing a number of regions having predetermined temperature so that such temperature regions will not be confused and become obscure, transferring the forming molds in said temperature region stages, whereby forming temperature process necessary for the synthetic resin material poured into said forming molds to be formed into articles is given.

More particularly, in this heating device, the forming molds are transferred continuously or intermittently, hot gas is blown on the surfaces of such forming molds at high speed and at substantially right angle thereto, and the gas current thus blown is caused to be sucked so that the current is not mixed with other temperature regions, whereby the temperature of each region is maintained.

More detailed explanation will be made referring to FIG. 4 through FIG. 8.

The main body 61 is installed on the floor, side walls 62, 62, ceiling wall 63 are closed, end wall 64 at entrance side and end wall 65 at exit side are each provided with passage (not shown) opened and closed freely for passage of forming metal molds 19. Close to the main body 61, there is provided a hot air producing device 66, which is so adapted that hot air is produced by combustion vapor of gas injected through a nozzle. A duct 67 connected to the upper portion of the hot air producing device 66 is further connected to a bent duct 68 and the duct 68 is opened at one side of a blower casing 69 mounted on the ceiling wall 63. A blower 70 is internally accommodated in the blower casing 69, and the hot air sucked from said duct 68 is fed into a duct 71 connected on the other side of the blower casing 69. In the drawing, the numeral 72 designates a propeller shaft of the blower, 73 is a pulley fixed on the propeller shaft of the blower 72, 74 is a pulley fixed on a shaft of a motor 75, 76 is a belt.

Further, a duct 78 is provided on the lower side of a duct 77 connected to the end of the duct 71, and a distributing duct 79 is provided below the duct 78. An upper feeding duct 80 and a lower feeding duct 81 are provided laterally each opening on one side of the distributing duct 79. These ducts 80, 81 extend into the main body 61 through the side wall 62 while keeping a vertical distance with each other. The duct 80 is connected to an upper blowing-suction mechanism 82 provided in the main body 61, and the duct 81 is connected to a lower blowing-suction mechanism 83 provided in the main body 61. The upper blowing-suction mechanism 82 and the lower blowing-suction mechanism 83 are each connected to said hot air producing device 66 by delivery ducts 84, 85 extending through the side wall 62 of the main body 61 respectively.

The upper blowing-suction mechanism 82 and the lower blowing-suction mechanism 83 are symmetrical against the horizontal plane.

Figure 6:
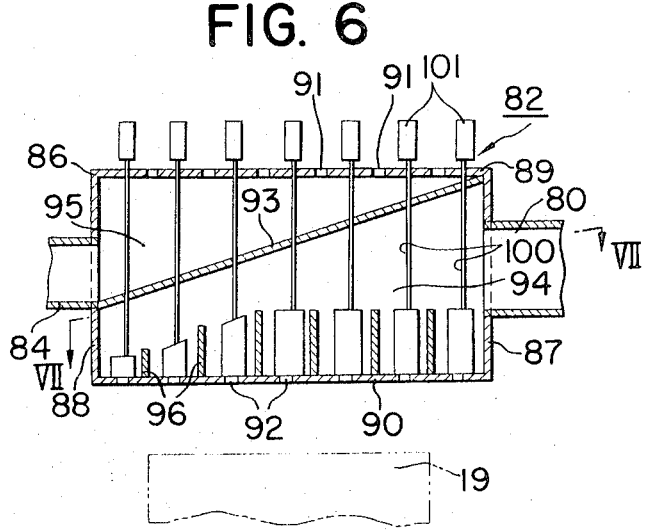
FIG. 6 is a longitudinal sectional view of the heating device shown in FIG. 4.
Figure 7:
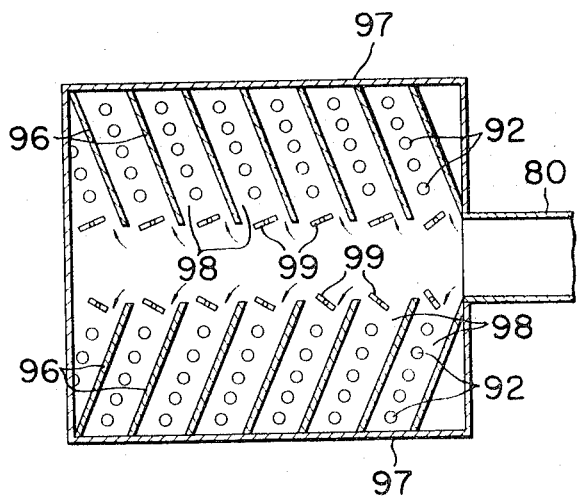
FIG. 7 is a sectional view as seen in a plane along the line VII—VII in FIG. 6.
Figure 8:
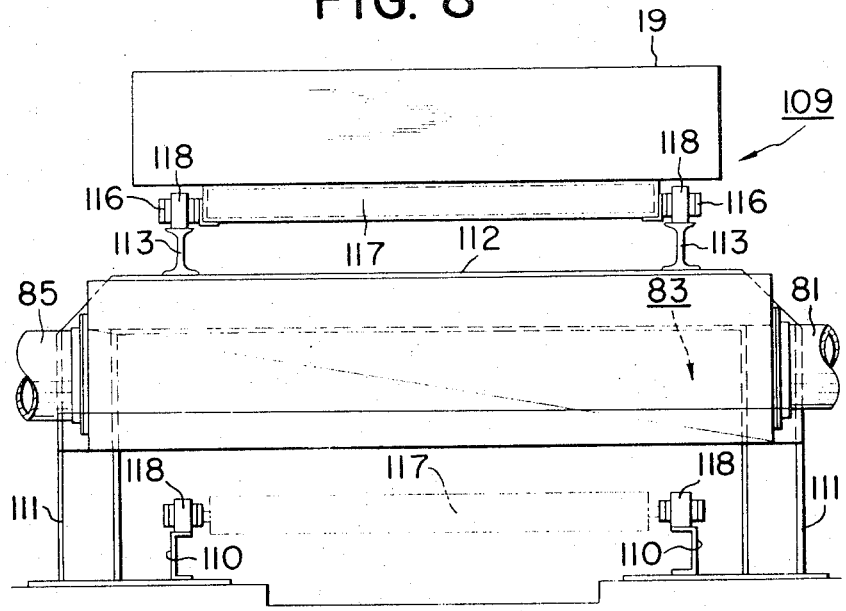
FIG. 8 is an end view of metal mold transferring mechanism portion.

An explanation will now be given of the upper blowing-suction mechanism 82 referring to FIGS. 6 and 7. The casing 86 of the upper blowing-suction mechanism 82 presents a rectangular form in vertical, longitudinal section, opening to said feeding duct 80 at the end plate portion 87, and opening to the delivery duct 84 at the end plate portion 88, and a large number of through holes 91, 91 . . . , 92, 92 . . . are provided at the upper plate portion 89 and the bottom plate portion 90, respectively. An inclined shielding plate 93 extending over the full width of the casing 86 is provided internally from the boundary portion of the end plate portion 87 and the upper plate portion 89 to the boundary portion of the end plate portion 88 and the lower edge of the delivery duct 84, defining the blowing chamber 94 and the suction chamber 95.

In the blowing chamber 94, partition walls 96, 96, . . . are provided vertically on the bottom plate portion 90. The heights of these partition walls 96, 96, . . . are made smaller at the left hand side in the drawing according to the inclination of the shielding plate 94. The partition walls 96, 96, . . . are arranged to have predetermined angles inclined from the side plate portions 97, 97, to the duct 80 side as seen in FIG. 6, and at the same time, each has a length in such an order as extending from the side plate portion 97, 97 to the lines of extention on the side portion of said duct 80. Further, dampers 99, 99, . . . are provided at the entrances of flow paths 98, 98, ... defined by each of the partition walls 96, 96, ... , each dampers 99, 99, ... being connected at the lower ends of connecting rods 100, 100, . . . extending through the shielding plate 93 and are exposed from the upper plate portion 89. Regulating mechanisms 101, 101, ... are provided at the upper end of the connecting rods 100, 100, . . . for the convenience of remote control.

Each of the through holes 92, 92, ... formed at the bottom plate 90 opens into flow paths 98, 98, . . . defined by the partition walls 96, 96, . . . .

The lower blowing-suction mechanism 83 has entirely the same, symmetrical construction as the upper blowing-suction mechanism 82 as seen in vertical direction, and in the drawing, the numerals 102, 103 designate each the blowing chamber, suction chamber, 104, 104, ... are blow-out holes, 105, 105 are suction holes.

A required number of hot air circulating systems 106, including above-said hot air producing device 66, the blower system, upper blowing-suction mechanism 82, and the lower blowing-suction mechanism 83, are provided along the longitudinal direction of the main body 61 at a predetermined distance. In this case, ambient atmospheres formed by hot air blown out of the upper blowing-suction mechanism 82 and the lower blowing-suction mechanism 83 in each of the hot air circulating systems 106, 107, 108 are maintained at predetermined temperatures.

Now, a transferring mechanism 109 of the metal molds 19 for forming synthetic resin will be described referring to the drawings. Rails 110, 110 are provided on the floor surface below each of the lower blowing-suction mechanisms 83, 83, ... , and further rails 113, 113 are provided on a frame 112 connecting supports 111, 111 provided between the circulating systems 106, 107, 108. A number of mold carrying rolls 117, 117, ... are arranged in a row supported by their ends by chains 116 looped over the sprocket wheels 114, 115 (see FIG. 4) mounted at the entrance and exit sides of the main body 61. The driving mechanism comprising the sprocket wheels 114, 115 and the chain 116 can be operated to feed continuously or intermittently. In the drawing, the numerals 118 designate rollers mounted on both ends of the rolls 117, and which facilitate the movement of the rolls on the rails 110, 113.

Figure 5:
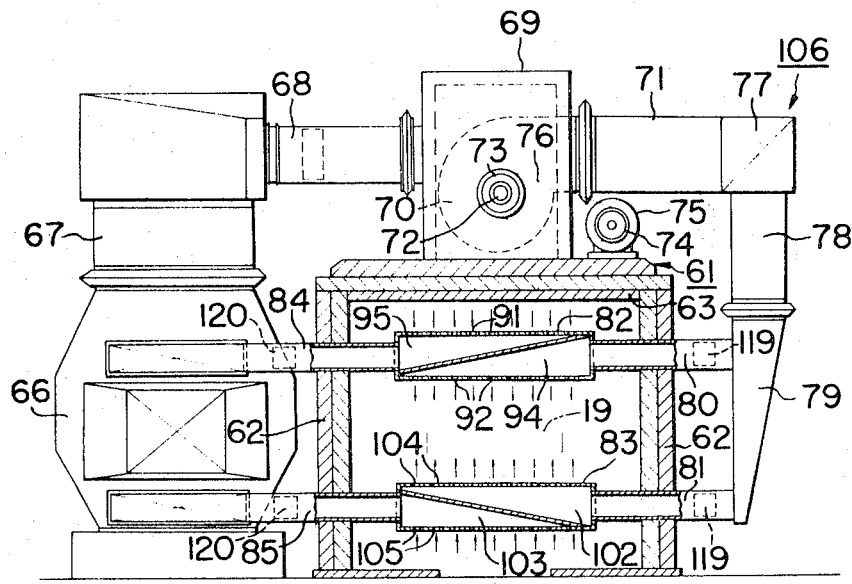
FIG. 5 is a longitudinal, sectional view in a widthwise direction of the heating device shown in FIG. 4.

In FIG. 5, the numerals 119, 119, ... show dampers provided in the feeding ducts 80, 81, the numerals 120, 120 show dampers provided in the delivery ducts 84, 85.

With the devices described as above, a description will be given for the case in which a pallet is to be manufactured.

First, driving the hot air producing devices 66, 66, 66 and the blower to operate the hot air circulating systems 106, 107, 108, and distributing and feeding hot air to each of the upper blowing-suction mechanism 82 and the lower blowing-suction mechanism 83 from the feeding ducts 80, 81 through the hot air producing device 66 and the blower.

The hot air thus introduced to the upper blowing-suction mechanism 82 enters each of the flow paths 98 between partition walls 96 while being controlled by dampers 119, 99, ... and is blown out of the blow-out holes 92, 92, ... in the bottom plate portion 90. In this case, the air blown out of the blow-out holes 92, 92, ... by the action of the shielding plate 93 is in a direction substantially vertical downwardly. Such hot air rises along the side plates 97, 97, of the casing 86 owing to the attractive force through the suction holes 91, 91, . . . provided in the upper plate portion 89 of the suction chamber 95 by a sucking action through the delivery ducts 84, 85, and the convection of the hot air itself, and is sucked from the suction holes 91 in the upper plate portion 89. Thus the hot air does not spread out so wide other than the width of the casing 86, but flows along the side plates from the down-ward jet stream, forming substantially circulating currents on both wings in vertical planes in the widthwise direction of the casing 86. The movement of the hot air supplied to the lower blowing-suction mechanism 83 from the feeding duct 81 is opposite to the horizontal plane to that of the upper blowing-suction mechanism 82, and the hot air blown out of the blow-out holes 104, 104, . . . formed in the upper plate portion of the lower blowing-suction mechanism 83 is separated into both wings forming downward currents, and are soon sucked through the suction holes 105, 105, ... in the bottom plate portion, and are introduced to the hot air producing device 66 through the delivery duct 85.

With such a circulation of the hot air, it is possible to predetermine the ambient temperature near the upper blowing-suction mechanism 82 and the lower blowing-suction mechanism 83. In this way, predetermined temperature regions, for example, 400° C region, 350° C region, 250° C region are established by each of the hot air circulating systems 106, 107, 108 in the longitudinal direction of the main body 61.

Accordingly, it is possible to produce synthetic resin formed articles first by filling a resin containing a foaming agent, a bridging agent etc. into the forming molds 19, operating continuously or intermittently the transfer mechanism for forming 109 so as to preheat sufficiently the forming molds 19 in the first temperature region, then applying an appropriate temperature to the filled resin in the molds 19 in the following temperature region causing the resin to foam and to form, and finally applying a temperature necessary for bridging in the third temperature region.

With the present apparatus, the maximum advantageous characteristic is developed when large-sized formed articles are to be produced. In case the formed articles to be produced are not so large, the dampers located at the area projected by the molds are closed, thus it is possible to increase the thermal efficiency by increasing the flow velocity from the blow-out holes.

Furthermore, to transfer the forming molds continuously for producing products of different shapes, it is also possible to control the current velocity from the blowing holes by operating dampers 99, 99, provided at the entrance of the flow paths 98, 98, . . . of the upper blowing-suction mechanism 82 and the lower blowing-suction mechanism 83, in response to the capacity for each of the different forming molds.

As for said hot air producing device, having systems such as a gas burner system, electric heater system, steam generating system may be used. For the case where the gas current is used, propane gas, city gas, gas produced by combustion, heavy oil, kerosene, etc. can be used as the fuel.

The hot air which has been led out the main body through the delivery duct may also be utilized for preheating fresh air or preheating forming molds instead of introducing it to the recycling process.

Furthermore, when the thickness of the forming mold is relatively large, or when the forming mold is a hollow one, an anxiliary duct is provided between the feeding ducts at the right angle to the distributing duct, and the hot air may be blown directly against the side surface of the forming mold, or the hot air may also be caused to flow into the hollow portion of the forming mold.

DIRECTION CHANGING DEVICE FOR METAL MOLD

The direction changing device for a metal mold in said station 1 in the line has a construction as follows.

The object of this device is to control the posture of the metal mold 19, and in this example, it is intended to change the direction of advance by 90° between the cooling station 14 and the drying station 2.

Figure 10:
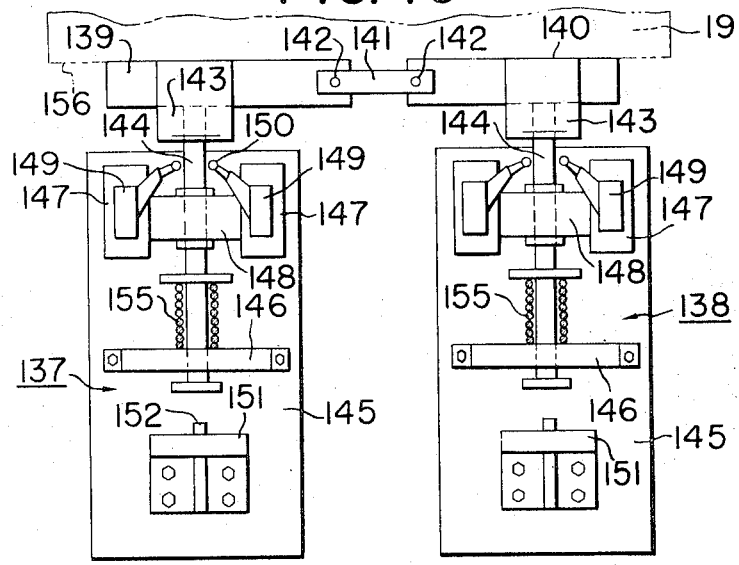
FIG. 10 is an enlarged plan view the mechanism shown in FIG. 9.
Figure 11:
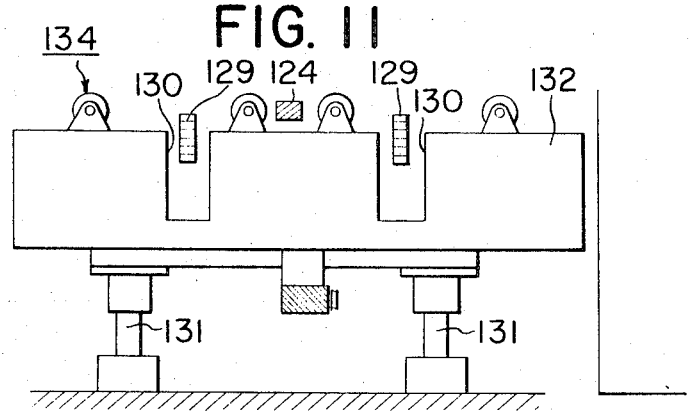
FIG. 11 is a longitudinal sectional view through a line XI—XI in FIG. 9.

The device will be explained referring to FIGS. 9 through 11.

Figure 9:
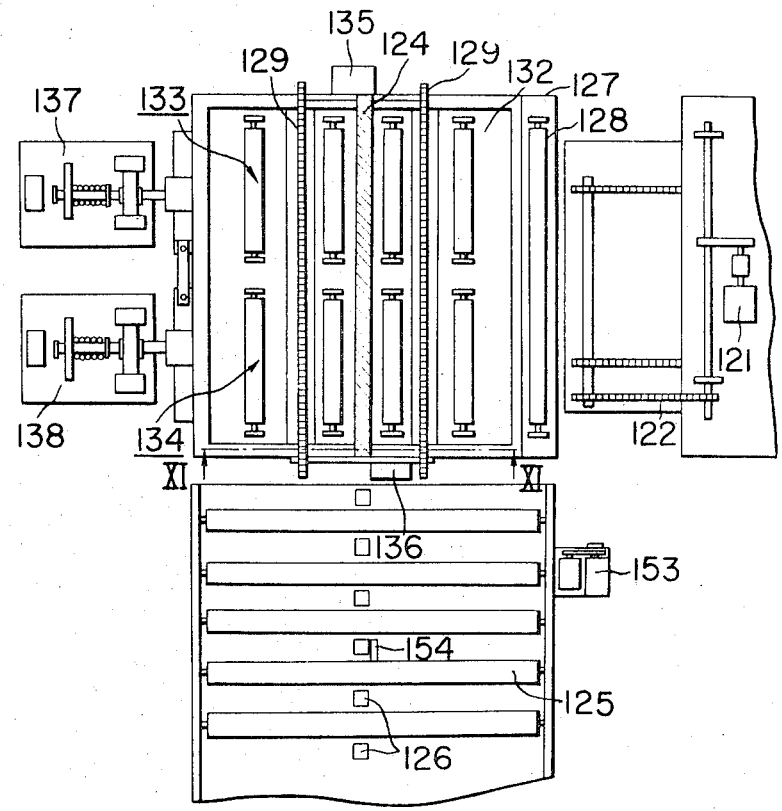
FIG. 9 is a plan showing the direction changing mechanism of metal molds.

In FIG. 9, the metal mold 19 which has been cooled at the cooling station 14 is passed to the following direction changing station 1 of the metal mold 19 by a chain conveyer 122 driven through a driving mechanism 121 provided on the cooling station 14. In this station, the advancing direction of the metal mold 19 is changed for 90°, and the metal mold 19 is forwarded to the next drying station 2. Such a change of direction in an automatic line system should be effected always correctly, or the following operations of the devices for automation are made impossible or difficult. Accordingly, in this example, a straight guide slot 123 is provided along the centerline of the bottom surface of the lower mold 18 (refer to FIG. 17) for changing the advancing direction for 90° always correctly, so that when the guide slot 123 and a guide ledge or projection 124 provided previously on the station 1 is engaged, a correct change of position is determined. Furthermore, guide projections 126, 126, . . . are provided between rolls of the roller conveyer 125 between the station 2, whereby the metal mold 19 is transferred always with a correct posture. The constructional detail of the station 1 is as follows. The frame 127 is provided with a feed roll 128 and also fixed with a guide projection 124, and chain conveyers 129, 129 for transferring metal mold 19 are provided on both sides of the guide projection 124. At the position of said chain conveyers 129, 129, notches 130, 130 are formed without obstructing the motion of these conveyers 129, 129, and a supporting plate 132 which can be raised or lowered by air cylinders 131, 131 are provided inside the frame 127 (refer to FIG. 11). On the upper surface of the supporting plate 132 there are provided a set of rolls 133, 134 arranged in two rows, and the roll groups 133, 134 are rotated by a driving system 135, 136, each of said rolls 133, 134 being arranged to operate independently. Instruction mechanisms 137, 138 for position control are provided on the left-hand side of the frame 127. The instruction mechanisms 137, 138 for position control have a construction as shown in FIG. 10. The opposite ends of each of stopper plates 139, 140, which can be abutted freely on the side surface of the metal mold 19, are pivoted on the mechanism 137, 138 by means of pins 142, 142 at each end of the connecting member 141. The construction of the mechanism which operates controlling through each of the stopper plates 139, 140 are the same as both of the instruction mechanism 137, 138. The instruction mechanism 137 is described in FIG. 10, with respect to the left-hand side, and as for the right-hand side, the same members are used and the same symbols are used as the left-hand side. An actuator 143 for a limit switch is fixed on the stopper plate 139, a rod 144 connected to the actuator 143 is advanced and retreated freely by means of a bearing 146 provided on the base 145 and a slider 148 sliding on the opposed wall surface of the guide members 147, 147. Each of the guide members 147, 147 are provided with a limit switch 149, and the driving system 135 of said rollers 133, 133 is controlled by the actuator 143 through the contactor 150 of the limit switch 149 and through the limit switch 149.

In this case, the instruction mechanism 137 on the left-hand side, in FIG. 9, is made to correspond with the roll group on the upper side, and the instruction mechanism 138 on the right-hand side is made to correspond with the roll group on the lower side. In the drawing, 151 is a stop mechanism for the rod 144 abutting on the end portion of said rod, and 152 is a fine adjusting bar for abutting surface provided on the stopper mechanism 151. The roller conveyer 125 of carrying route shown in FIG. 9 is driven by a driving system 153, and a limit switch 154 provided between the roller conveyer 125 gives instruction to the driving system 153. In FIG. 10, 155 denotes a return spring.

Such a direction changing device of the metal mold is operated as follows. In the direction changing station 1 of the metal mold 19, the supporting plate 132 is kept raised at the receiving of the metal mold 19, and when the metal mold 19, which has been transferred from the cooling station 14 to the changing station 1, is not in a correct posture to the advancing direction, that is, the front surface 156 of the metal mold 19 is not in a correct condition, for example, not in a perpendicular plane to the axis of the advancing direction, but at an oblique angle, one of the instruction mechanisms 137, 138 for posture control abuts first with the front surface 156 of the metal mold 19, if the abutting surface of each of the stop plates 139, 140 are previously aligned on the same plane. In this case, since the actuater 143 of the instruction mechanism 137 at the abutting side is made integral with the stop plate 139, the rod 144 is retreated through the actuator 143. Whereby the limit switch 149 is operated, and gives order to stop the driving system 135 of the roll groups 133, 133, . . . and the roll groups 133, 133, . . . are stopped. In the mean while, when the front surface 156 of the metal mold 19 abuts on the stop plate 140 of the other instruction mechanism 138, the limit switch 149 operates in a similar manner, the rotation of the roll groups 134, 134 are stopped. In this way, the side portion of the metal mold 19 at the side abutted on one of the stopper plate 139 is stopped of its advance, and the other instruction mechanism 138 does not actuate until the front surface 156 of the metal mold 19 abuts on the other stopper plate 140, rotation of the roll groups 134, 134 is continued until the guide slot 123 provided on the bottom surface of the metal mold 19 is engaged with the guide projection 124 provided on the station 1. Accordingly, since one side of the metal mold 19 continues its advance when the other side of the metal mold 19 is stopped, the posture of the metal mold 19 is controlled to the normal condition. Thus, when the guide slot 123 provided at the bottom surface of the metal mold 19 controlled of its posture through the instruction mechanisms 137, 138 and the guide projection 124 provided on the station 1 are engaged perfectly, the supporting plate 132 is lowered.

Thereafter, the metal mold 19 is passed to the direction of the carrying route by the chain conveyers 129, 129, and further, rotating the roller conveyer 125, driven by the driving system 153 operated by the front surface 156 of the metal mold 19 and the limit switch 154, and the metal mold 19 is advanced.

When the front surface 156 of the metal mold 19 is placed in parallel with the stopper plates 139, 140 and the metal mold 19 is transferred, and abutted on the stopper plates 139, 140 simultaneously, the limit switches 149, 149 operate simultaneously to stop the roll groups 133, 134, the guide slot 123 and the guide projection 124 are engaged, and the supporting plate 132 is lowered.

UPPER MOLD ATTACHING AND DETACHING DEVICES FOR METAL MOLDS

An attaching and detaching device of an upper mold 17 for a metal mold 19 adopted in the stations 3, 8 of said line is so constructed that this device dispenses with labor as much as possible and attaching and detaching of the upper mold 17 can be carried out efficiently and mechanically.

This device will be described hereinbelow referring to FIGS. 2, 3 and FIG. 12 through FIG. 16.

Figure 12:
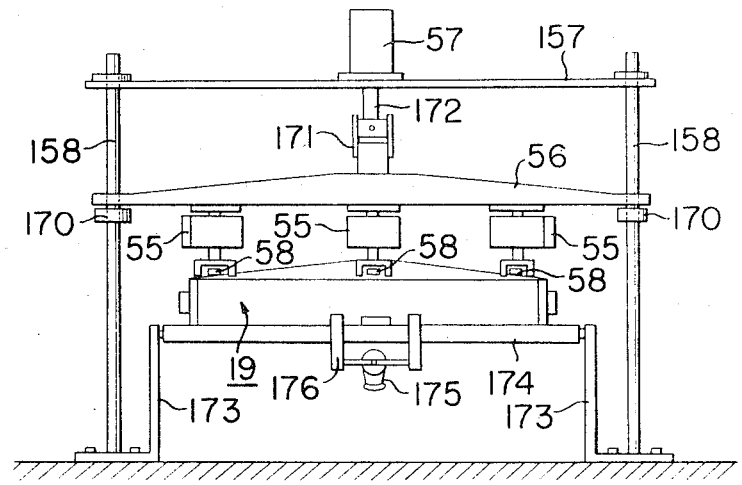
FIG. 12 is a side elevation of the opening and closing mechanism of metal molds.
Figure 13:
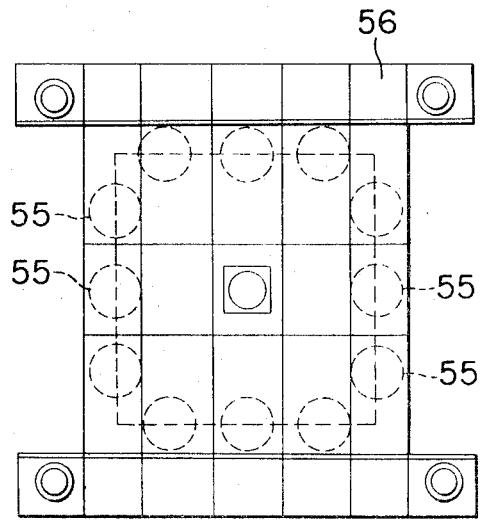
FIG. 13 is a plan showing a plan of the opening and closing mechanism of metal molds.

In FIG. 12, guide bars 158, 158, ... to guide going-up and down motion of an adapter plate 56 are provided on a frame 157. There is provided an adapter plate 56 which is guided by said guide bars 158, 158, ... and moved up and down by a hydraulic cylinder 57 provided on the frame 157. A dozen rotary clamping means 55, 55, ..., as shown in FIG. 13, are vertically provided at the lower surface of said adapter plate 56. The positions where these rotary clamping means 55, 55, ... are disposed are designed to correspond to the positions of clamp mechanisms 159, 159, ... provided on a metal mold 19.

Said respective rotary clamping means 55, 55, ... are formed as shown in FIG. 14. At the lower surface of the adapter plate 56, there is provided a case 160 in which a rotor (not shown) is stored, the rotor being driven by air. By supplying the case 160 with air or by interrupting supply of air, a rotary shaft 161 is rotated in the positive direction, in the counter direction, or stopped. At the lower end projecting part of said rotary shaft 161, there is provided a doubling means 165 which has two down pawls 164, 164 and which is securely fixed by a fringe 162 and a patch metal 163. Said pawls 164, 164 are so designed, as shown in FIG. 15, as to be applied from both sides thereof with respect to the clamp handle 58 of the clamp mechanism 159 provided on the metal mold 19. Further, to relieve the impact caused by dropping down the doubling means 165 to operate thereof, a spring 166 is provided around the rotary shaft 161 between the case 160 and the patch metal 163.

Clamp mechanisms 159 are provided, as shown in FIG. 16, at predetermined positions of the metal mold 19. These clamp mechanisms 159 comprise a clamp plate 168 having a slope surface 167 and fixedly provided on the upper mold 17 of the metal mold 19, a supporting post 169 vertically provided on the lower mold 18 with respect to said clamp plate 168, and said clamp handle 58 inserted rotatably into said supporting post 169. In addition, stoppers 170, 170, ... which control the fall position of the adapter plate 56 are respectively provided on said guide bars 158, 158, .... Moreover, in this case, an universal joint 171 is provided at the upper surface center of said adapter plate 56, thereby to connect the lower end of a rod 172 of the hydrauric cylinder 57 and said adapter plate 56 by means of said universal joint 171.

The operation of this device will be described hereinbelow referring to FIG. 12.

A metal mold 19 which has been transferred by means of the roller conveyor 174 which consists of a group of rolls supported rotatably on both their edges by a frame 173 of a conveyer route has reached stations 3, 8 in which an upper mold 17 is attached and detached, guided by center guides (not shown) provided at places of said conveyer route. In this case, the metal mold 19 is stopped at the normal position by means of striking it against stoppers 176, 176 which are driven by an air cylinder 175. When said metal mold 19 is stopped at the predetermined position, the adapter plate 56 falls. The pawls 164, 164 of the doubling means 165 for respective rotary clamping means 55, 55 ... provided on this adapter plate 56 are engaged with the clamp handle 58 of the clamp mechanism 159 of the metal mold 19. In the condition as mention above, air is supplied to the case 160 to rotate the rotary shaft 161 by about 90° – 110° thereby to clamp forcefully the clamp handle 58 against the clamp plate 167. When supply of air to the case 160 is carried out in contrast with that of clamping, the rotary shaft 161 is rotated reversely thereby to loosen the clamp between the clamp handle 58 and the clamp plate 167 by means of the pawls 164, 164. As respective rotary clamping means 55 are designed to operate synchronously therewith, clamping and unclamping of the upper mold 17 can be automatically carried out at a stretch. When the attaching and detaching of the upper mold 17 is completed by means of the rotary clamping means 55, 55, ... the adapter plate 56 is elevated by means of a hydraulic cylinder 57.

PARTING DEVICE FOR FORMED ARTICLES:

The structure of the device for parting the formed articles from the metal mold 19, which is adopted in the station 5 of the aforementioned line is constituted to be as follows.

In a combination mold of said metal mold 19, that is, a box-shaped lower mold 18 and an upper mold 17 which is mounted, like a cover, on said lower mold 18, the use of said device is suitable when a core 34 is inserted within the lower mold 18, or when the core 34 is taken out, under the state where the upper mold 17 is removed.

The description for the device will be given by referring to FIG. 17 through FIG. 19.

As shown in FIG. 22 through FIG. 25, a support frame 177 of a core 34 is united at the side wall of the lower mold 18 with respect to the metal mold 19 and the core 34 which are used for the device. Further, a clamp lever 179 is securely supported by means of a pin 178 securely planted on both end-surfaces of the support frame 177.

Further, there are provided core hooks 35, 35 of square frame shape on an outer surface of the support frame 177. And, one of the two core dividing members 180, 180 divided in two, which form the core 34, are parallelly projected, at a set position, in the horizontal direction on the inner surface of the support frame 34. The two core dividing members 180, 180 parallelly projecting on the support frame 177 such as mentioned above are symmetrically provided at the left and right sides. Furthermore, the opposed ends of the core dividing member 180 and the core dividing member 180 are respectively composed in a frame inserting construction, thus being formed to fit one with other. As shown in FIG. 19, the outer end of the above-described clamp lever 179 is formed to be a curved surface of semicircular shape when it is laterally observed. Further, at the inner end thereof, there is provided a notch 181; Said notch 181 being formed to be fit securely with a hook pin 182 securely mounted on the side surface of the lower mold 18.

Figure 17:
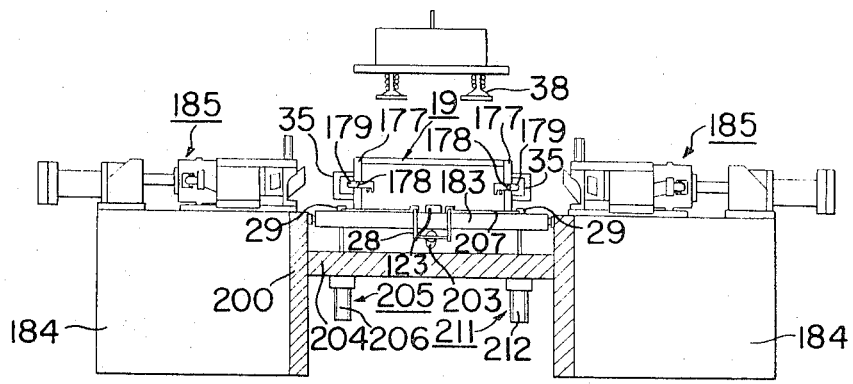
FIG. 17 is a side elevation partly in longitudinal cross section showing details of mechanism for taking out the core from the metal mold and taking out the formed article from the metal mold.

In FIG. 17, there are provided base pedestals 184, 184 on both sides of a conveyor route consisting of a roll 183 line group, and a core insertion and detraction mechanism 185 for inserting or taking out the core 34 is mounted on each base pedestal 184. As shown in FIG. 18, a support member 36 which is advanced or reversed, by means of a rod 187 of a laterally releasing cylinder 30, in accordance with the guidance by guide rails 186, 186 which are respectively and parallelly provided on said base pedestal 184, is provided on said core insertion and detraction mechanism 185. The core fixing cylinder 32 which can be freely oscillated within a horizontal surface by appointing a support shaft 188 as a fulcrum is provided on said support member 36 on both its end-parts. A clamp 33 for holding the core hook 35 is provided on the inner-end of each cylinder 32, at the end of a support bar 191 of which the one end part is securely fixed to a bracket 189 which is securely fixed to the rod, and of which the other end part is supported by a guide member 190. Further, each rod 192 of the hydraulic cylinders 31, 31 which is mounted on the support member 36, and which extends respectively in a contrary direction, and the outer end of the abovedescribed cylinder 32 are swingably connected by means of a pin 193. On both ends of the support member 36, there are provided, respectively, clamping mechanisms 194, 194 which functioned to clamp a clamp lever 179 securely fixed to the support frame 177 of the core 34, to the lower mold 18. Said clamping mechanism 194 consists of an operation member 197 securely fixed to the end of the rod 196 of a down-draft air cylinder 195 mounted on the support member 36, and the abovementioned clamp lever 179, wherein said operation member 197 can be freely advanced and reversed in the horizontal direction together with the support member 36.

Further, the mechanism is constituted to be freely moved upwardly and downwardly by the air cylinder 195. The operation member 197 has a curved action surface 198 to correspond to an outer end portion of the clamp lever 179.

Figure 18:
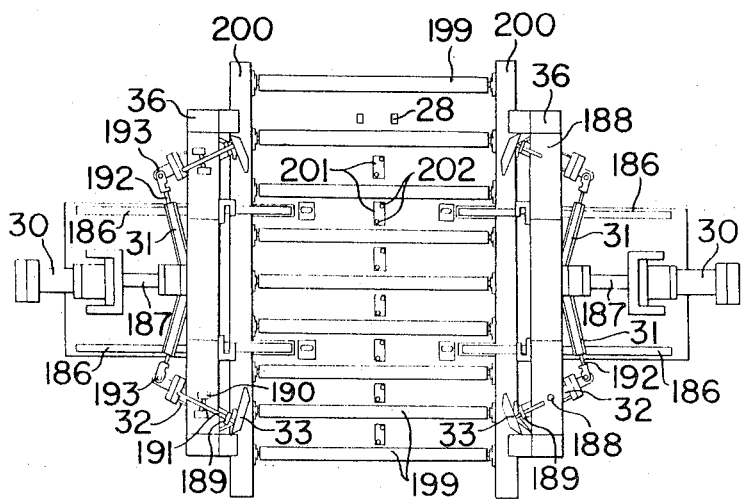
FIG. 18 is a plan view of the mechanism shown in FIG. 17.

As shown in FIG. 18, both ends of rolls 199, 199, . . . . which form the conveyor route are rotatably supported by the frame 200, and the guide members 201 . . . are provided between the respective rolls 199, 199 . . . each of which is inserted into a guide slot 123 provided on the bottom surface of the lower mold 18 of the metal mold 19, and each of which guides the advancement of a mold 19. On the upper surface of these guide members 201 . . . , there are provided rollers 202, 202, in a zigzag form, which rotate in the horizontal state. Further, there is provided a position setting stopper 28 which stops the metal mold 19 at the set position; said stopper 28 being formed to freely appear and disappear, through the intervals of the rollers 199, and from the upper surface of the roll 199 group, by means of the hydraulic cylinder 203. Further, a clamp mechanism 205 which functions to securely clamp the metal mold 19 at the set position of the conveyor route consisting of the roll 199 group, is provided on the cross-girder 204 of the frame 200, thereby to carry out the taking-in-and-out of the core 34 from the metal mold 19 smoothly and accurately. In said clamp mechanism 205, key-shaped clamps 29 are formed at the end of the rod of an up-draft hydraulic cylinder 206, and the clamps 29 functions to securely clamp a bottom plate 207 at the four corners of the bottom plate 207 of the metal mold 19 by a downward press motion. By operating the hydraulic cylinder 206, the bottom plate 207 is passed through when the clamps 29 are lifted, and when the bottom plate 207 reaches the set position, it is clamped by contracting the rod downwardly.

The operation of the device will be described as follows.

Figure 2:
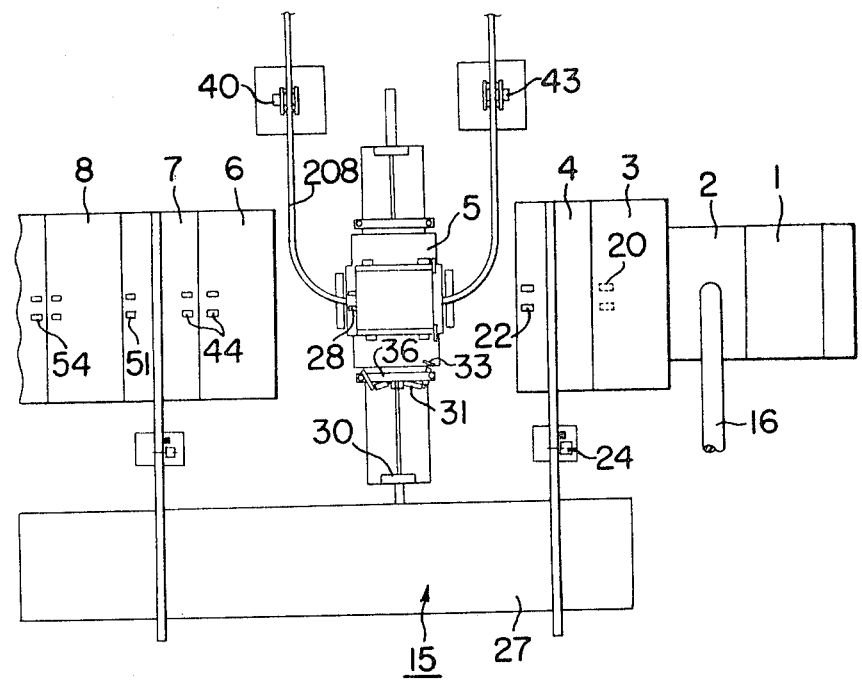
FIG. 2 is a plan view showing in somewhat more detail stations in said automatic line system depicted in FIG. 1.

As shown in FIG. 2, the metal mold 19 is transferred from a station 4 to a station 5 by means of a roller conveyor, whereat the stop position is determined by a stopper 28 at a set position.

Then, the clamps 29, 29 . . . are clamped at the four corners of a bottom part 207 of the metal mold 19 by operating a hydraulic cylinder 206, thereby to securely clamp the metal mold 19. And then, the rods 187, 187 are respectively stretched by operating each laterally releasing cylinder 30, thereby to advance each support member 36 to the closer position respectively. When respective support members 36, 36 approach respective support frames 177, 177 of the corresponding cores 34, 34, each support member 36 is stopped. Then, by operating respective hydraulic cylinders 31, 31 and cylinders 32, 32, respective oscillation cylinders 32, 32. 32, 32 are oscillated by appointing a fulcrum 188 as to be a center thereof. Then, the clamps 33, 33, 33, 33 for holding core hook are oscillated in the inner direction thereby to set them into the core hooks 35, 35, 35, 35 provided on each outer surface of support frames 177, 177 of respective core dividing members 180, 180. And then, the cylinders 32, 32, 32, 32 are operated thereby to securely support the support frames 177, 177 of each core 34 by means of respective support members 36, 36 provided on the left and right sides thereof by the clamps 33, 33, 33, 33 for holding the core hooks, through the core hooks 35, 35, 35, 35. When the operation for supporting the core 34 by means of the clamps 33, 33, 33, 33 for holding the core hooks such as described above is carried out, the clamping mechanism 194 for the core 34 and the lower mold 18 provided on both sides of the support member 36 are also operated. That is, as shown in FIG. 19, when the support member 36 is advanced, the clamped lower mold 18 of the metal mold 19 and the support frame 177 of the core 34 approach the curved surface of semi-circular arch shape at the outer end of a clamp lever 179 in the state where it is clamped by a notch 181 of the clamp lever 179 and a pin 182. Then, the action surface 198 of the operation member 197 is contacted with the outer end portion of the clamp lever 179 and is advanced, whereat the clamp lever 179 is rotated, in the direction as shown by an arrow, by the action surface 198, whereby the clamped condition caused by the notch 181 of the clamp lever 179 and the pin 182 is released. Thus, the clamps of the core 34 and the lower mold 18 are disengaged, and when the core 34 is securely supported, through the support frame 177, by the clamp 33 for holding the core hook of the support member 36, the support member 36 is retracted along two parallel guide rails 186, 186 by operating the laterally releasing cylinder 30, thereby to pull out the core 34 from the formed article, and to leave the formed article molded by the mold 19 and the core 34 within the lower mold 18. When the core dividing members 180, 180 at the left and right sides were completely pulled out from the formed article, the support members 36, 36 are stopped, through the rod 187, by stopping the operation of the laterally releasing cylinder 30. At this time, as respective core dividing members 180, 180 at the left and right sides are securely held by the clamps 33, 33 for holding the core hook, there is no fear that the nose end of the core dividing members 180, 180 comes down.

Figure 3:
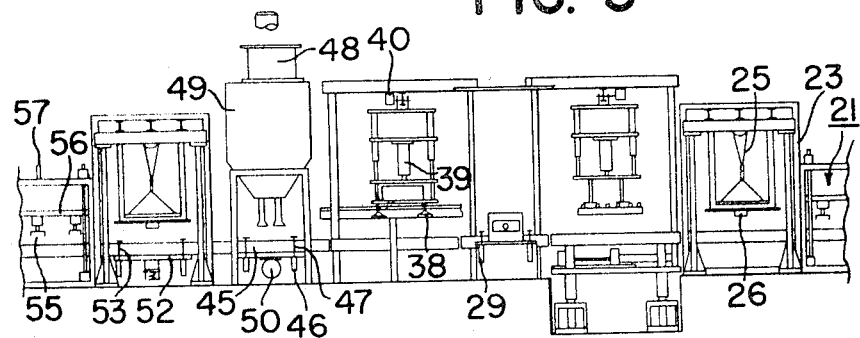
FIG. 3 is a side elevation of the stations shown in FIG. 2.
Figure 4:
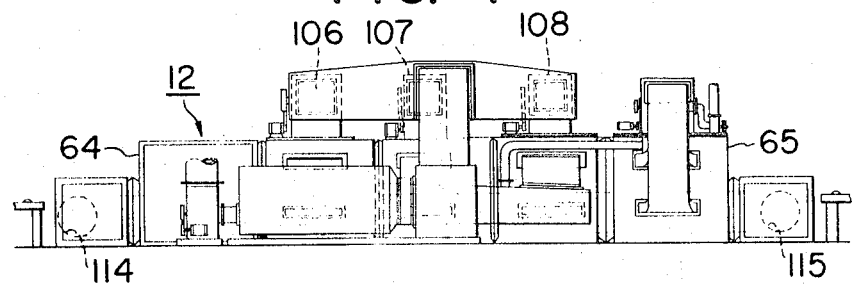
FIG. 4 is a side elevation of the heating device.

Then, as shown in FIG. 3, the vacuum pads 38, 38 of an adsorption lifting mechanism is timely brought to the upper position of the formed article within the lower mold 18, whereat the formed article is lifted from the mold 18 by means of vacuum pads 38, 38, by lowering the mechanism, and then, the adsorption lifting mechanism is transferred along with the overhead travelling rail 208 thereby to convey the formed articles to the set position. Thereafter, the adsorption lifting mechanism is kept at the set position.

During the abovedescribed operation, as the lower mold 18 is securely fixed and held, through the clamps 29, 29, by means of a metal mold clamp mechanism 205, there is no trouble, during the operation, which is caused by the swing motion of the metal mold 19 in the longitudinal, left and right directions.

When the formed article is taken out from the lower mold 18, water drops of the lower mold 18 and core 34 are removed, and then a mold releasing agent is coated thereon.

Next, the description with respect to the process for setting the core 34 within the lower mold 18 will be given hereunder.

Respective support members 36, 36 are advanced by operating each laterally releasing cylinders 30, 30 provided at the left and right sides, and respective cores 34, 34 being held thereby are transferred within the lower mold 18, then, the opposed core dividing members 180, 180, 180, 180 are brought together and then, by fitting the frame inserting construction 209, 210 formed at the opposed ends of the core dividing members 180, 180, 180, 180, the positions of the core dividing members 180, 180, 180, 180 are correctly set and determined. Thereafter, the clamp lever 179 is engaged with a pin 182 by elevating the operation member 197 by means of the hydraulic cylinder 195, and, after the clamps 33, 33, 33, 33 for holding the core hooks are respectively disengaged therefrom by operating the hydraulic cylinders 31, 31 and cylinders 32, 32, the support member 36 is retracted by operating the laterally releasing cylinder 30, whereby the core 34 is set in the lower mold 18. At this time, when the opposed core dividing members 180, 180, 180, 180 provided at the left and right sides approach each other and when the forward ends thereof are fit in the lower mold 18, as a hydraulic system which functions to rapidly reduce the speed thereof is provided at the laterally releasing cylinder 30, the fittings of the forward ends of the core dividing members 180, 180, 180, 180 can be smoothly carried out as they are being advanced slowly.

In this embodiment, a reinforcing frame 42 is inserted after the core 34 is set in the lower mold 18. In the case where the reinforcing frame 42 such as described above is inserted, as a mechanism which is advanced and retracted by holding the core, which is comprised in this device for setting the core 34 in the lower mold 18, always enables to ensure the accurate positioning and the holding condition thereof, the core 34 can be set in the lower mold 18 without any trouble.

This device is very suitable to be utilized as a parting device for formed articles in the manufacture of large size formed articles such as synthetic resin pallets. Especially, the use of said device is extremely suitable when the core is required to be used.

This device does not require any complicated formed articles pushing-up mechanism as required in the conventional art, nor labor for taking out the cores, wherefor, the parting mold work for large size formed articles is almost automated, and the conveyance of the formed articles is also carried out automatically.

Synthetically, according to the present invention, as manufacture of large size formed articles such as pallets which need a quantity of resin materials, can be continuously carried out efficiently, the productivity thereof is improved and the uniform quality of the products can be materialized.

It should be understood that said device can be utilized not only for the manufacture of pallets but also for the manufacture of various kinds of formed articles such as large size mat and vessels having thick and wide plain spread.

While a specific embodiment of the invention has been shown and described in detail to illustrate the application of the inventive principles, it will be understood that the invention may be embodied otherwise without departing from such principles.

What is claimed is:

1. Apparatus for producing thermoplastic synthetic resin foamed article characterized in that it comprises metal molds each consisting of an upper mold and a lower mold; a carrying path for said metal molds;

direction changing device for the metal molds provided in said carrying path; means for removing or detaching the upper mold from the lower mold; means for leading said upper mold which has been removed to another carrying path which is separated from said carrying path of said lower mold; a mold releasing device for taking out the core from the lower mold to take out the formed article from the lower mold, the mating upper mold thereof having been removed, and adapted to insert the lower mold again after the formed article has been taken out; means for filling a foaming resin material in the lower mold from which the formed article has been taken out; means for closing the metal mold by clamping the upper mold on the lower mold which has been filled with resin material; a heating device having at least three stages of temperature regions, namely for preheating of metal mold, heating of resin, and finishing of resin forming; and means for cooling metal mold containing the formed article.

2. Apparatus for producing thermoplastic synthetic resin foamed article as claimed in claim 1, characterized in that said mold releasing device comprising a holding mechanism consisting of core hook holding clamps provided on a supporting member which can be advanced or retreated freely, and a holding hook provided on the core; a clamp mechanism consisting of operating members provided on both ends of said supporting member, a clamp lever provided on the side surface of the core, and a pin provided on the lower mold; and a mechanism for taking out the core from said lower mold containing the formed article therein and raising the formed article and transferring it to a predetermined position.

3. Apparatus for producing thermoplastic synthetic resinous foamed articles comprising metallic molds each including an upper mold and a lower mold; means for transporting said molds in an endless path including means for changing the direction of travel of said molds; means for removing said upper mold from said lower mold; means for transporting said upper mold away from said endless path and for returning said uper mold to said endless path at a location downstream from the point of said removal thereof; means for removing a formed thermoplastic article from said lower mold; means for filling said lower mold with resinous thermoplastic material; means for placing an upper mold which has previously been removed from a lower mold upon said filled lower mold; means for heating said mold, said heating means comprising at least three consecutively arranged stages each producing a different temperature level; means for cooling said molds; and means for returning said molds to said upper mold removing means; each of said aforementioned means being consecutively arranged along said endless path in the order hereinbefore set forth.

4. Apparatus according to claim 3 wherein said heating means comprise an upper mechanism and a lower mechanism located one above the other and spaced apart a required vertical distance, with each of said mechanisms including a shielding plate separating said mechanism into a blowing chamber and a suction chamber, a hot air feeding duct opening into each of said blowing chambers, a delivery duct opening into each of said suction chambers, a plurality of partition walls disposed at required intervals in each of said blowing chambers to define therein flow paths into said feeding, duct, dampers provided at the entrances to said flow paths, said metallic molds being transported within said endless path between said upper and lower mechanisms, blow holes formed in said blowing chambers for directing hot air from said blowing chambers onto said metallic molds, and suction holes formed in said suction chambers for enabling hot air to be sucked thereinto for passage to said delivery ducts, said upper and lower mechanisms being arranged in at least three different regions at required distances within said heating means in a direction along said endless path of said metallic molds.

5. Apparatus according to claim 3, wherein said direction changing means comprise a supporting base, means for raising and lowering said base, at least two rows of roller conveyors each driven independently, an instruction mechanism for controlling the posture of said metallic molds by controlling said roller conveyors to stop or drive each independently, stopper plates arranged to be abuttable with said metallic molds, there being provided one stopper plate for each of said roller conveyors, means for enabling said instruction mechanism to stop or drive said roller conveyors in accordance with abutment of said metallic molds against said stopper means, and a chain conveyor for transporting said metallic molds in a direction normal to the direction imparted thereto by said roller conveyors.

6. Apparatus according to claim 3, comprising an adapter plate, means for raising and lowering said adapter plate, means for removing said upper mold from said lower mold provided on the lower side of said adapter plate, said upper mold removing means comprising a required number of rotary clamping means each having a pawl at its lower end, a clamp handle rotatably mounted on a supporting post provided on said lower mold, and a clamp plate fixed on said upper mold provided with a pressable inclined surface operable by said clamp handle.

* * * * *